Nov. 10, 1959

R. K. ANDRES 2,912,483

AUTOMATIC SWITCHING CIRCUIT

Filed Dec. 6, 1956

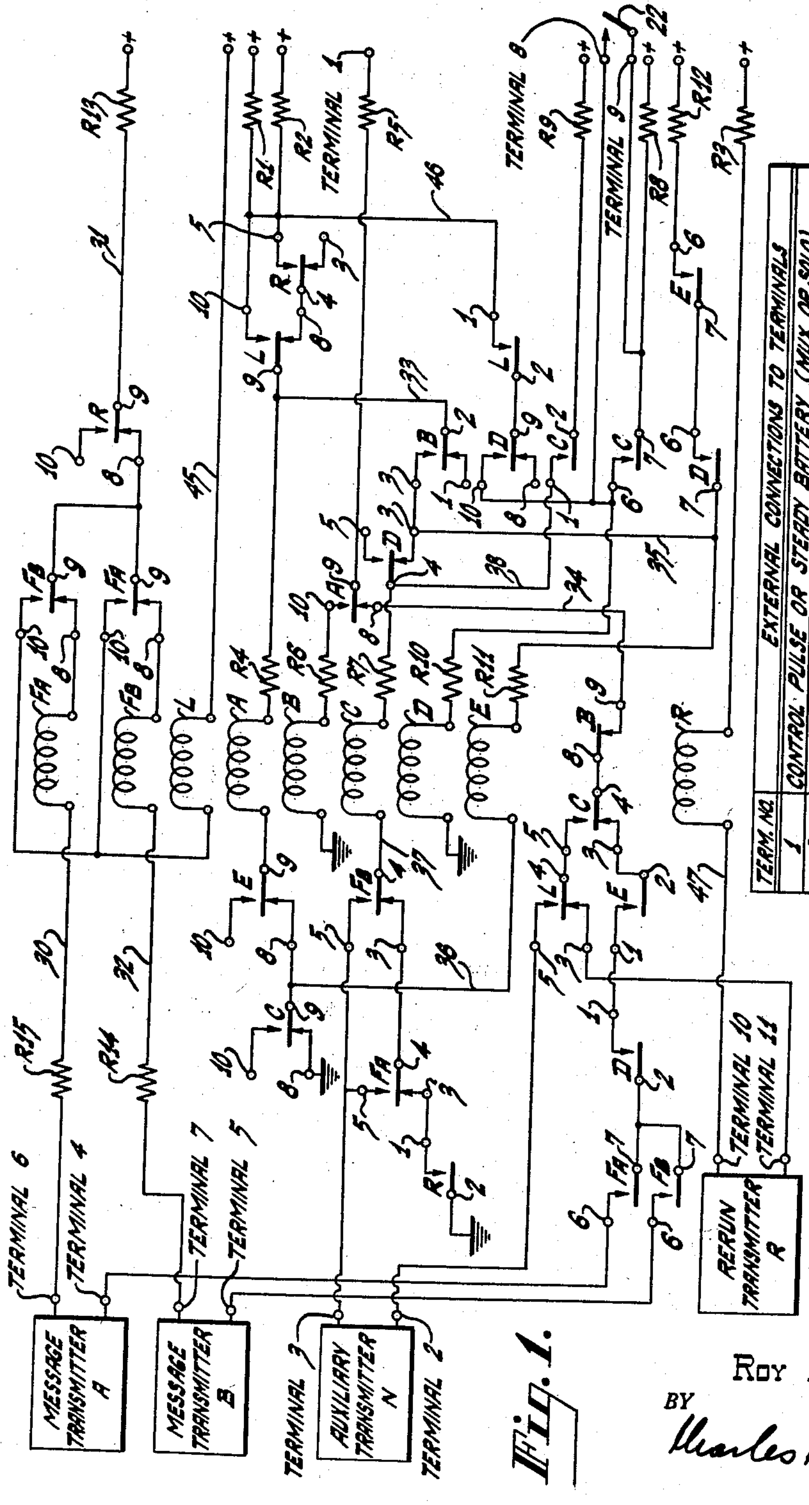

FIG. 1.

| TERM. NO. | EXTERNAL CONNECTIONS TO TERMINALS |
|---|---|
| 1 | CONTROL PULSE OR STEADY BATTERY (MUX. OR SOLO) |
| 2 | TO CLUTCH OF NUMBERING (N) TRANSMITTER |
| 3 | TO AUTOMATIC STOP CONTACTS OF "N" TRANSMITTER |
| 4 | TO CLUTCH OF "A" MESSAGE TRANSMITTER |
| 5 | TO CLUTCH OF "B" MESSAGE TRANSMITTER |
| 6 | TO AUTOMATIC STOP CONTACTS OF "A" TRANSMITTER |
| 7 | TO AUTOMATIC STOP CONTACTS OF "B" TRANSMITTER |
| 8 & 9 | TO NORMALLY OPEN PUSH BUTTON FOR NUMBER SUPPRESS |
| 10 | TO AUTOMATIC STOP CONTACTS OF RERUN TRANSMITTER |
| 11 | TO CLUTCH OF RERUN TRANSMITTER |

FIG. 2.

INVENTOR.
ROY K. ANDRES
BY Charles H. Brown
ATTORNEY

United States Patent Office 2,912,483

Patented Nov. 10, 1959

2,912,483

AUTOMATIC SWITCHING CIRCUIT

Roy K. Andres, Glen Cove, N.Y., assignor to Radio Corporation of America, a corporation of Delaware Application December 6, 1956, Serial No. 626,698

7 Claims. (Cl. 178—2)

This invention relates to automatic switching circuits and, more particularly, to an automatic switching circuit for multiple telegraph transmitter control.

Telegraph transmitting equipment, using any one of the common multi-element coded forms of transmission, particularly, remotely controlled equipment, is in many applications operated in response to a control signal which energizes or deenergizes an electromagnetic clutch mechanism. Automatic switching circuits have been devised, which are responsive to such a control signal, to act as a director for switching such a control signal among a plurality of telegraph transmitters. The control signal may be a continuous potential signal when the transmitters are operating solo or in single signal condition. In recent years, however, the multiplex operation of telegraph transmitters has found wide acceptance, much of telegraph communication now being carried out in this form of transmission. In addition, synchronous multiplex operation readily lends itself to error detection and automatic error correction systems of the return channel re-cycling type.

Automatic switching circuits have been constructed which are suitable for use with the continuous potential type of transmitter control signal. This type of control signal, however, cannot be used with the multiplex type of operation, because it is necessary to supply the control signal in a pulse form to synchronously operate a multiplex transmitter arrangement. A switching circuit suitable for use with a continuous potential controlled transmitter is not suitable for use with a pulse controlled multiplex transmitter due to the fact that in multiplex operation it is essential that the switching circuit act as both director and synchronizer of the control pulse to insure the synchronized operation of the telegraph transmitter. It has, therefore, been necessary to maintain different automatic switching circuits for both types of transmission, namely, multiplex and non-multiplex transmitter operation. Attempts to devise switching circuits suitable for use with both types of operations have resulted in complicated circuitry and arrangements including an excessive number of components and a manual operation to switch from one type of operation to the other.

For reasons of economy and ease of operation, it is necessary that a transmitting station be equipped with an automatic switching circuit which will be responsive to both types of control signals. Such an automatic switching circuit should be able to control the operation of a multiple number of message transmitters in response to either a continuous type of control signal or a pulse or multiplex type of control signal. In the operation of a transmitting station, it becomes necessary on occasion to repeat a message already transmitted. The message may have been improperly received or not received at all due to atmospheric conditions, a break-down in equipment, and so on. The automatic switching circuit should also be able, therefore, to provide for the preferential and automatic operation of one of the transmitters, designated as a rerun or repeat transmitter, such that a repeated message can be transmitted by the rerun transmitter following the transmission of a message by a message transmitter and before the transmission of a subsequent message by the same or a different one of the message transmitters.

It is an object of the invention to obtain an improved automatic switching circuit for multiple telegraph transmitter control.

It is a further object of the invention to obtain an automatic switching circuit which may interchangeably be utilized to control the operation of a multiple number of multiplex operated telegraph transmitters or a multiple number of non-multiplex operated telegraph transmitters, the circuit providing for the preferential and automatic operation of one of the transmitters used to complete the transmission of a repeated message.

It is another object of the invention to obtain an improved automatic switching circuit for multiple telegraph transmitter control which is simple and compact in construction.

In brief, the objects of the invention are accomplished by a switching circuit including a number of multiple contact relay devices. The contacts and windings of the relays are interconnected in such a manner that, when a particular telegraph message transmitter is selected for operation, the relays are activated and deactivated in a predetermined sequence to supply a control signal to successive individual transmitters of a group in a predetermined sequence. The sequence of operation is, in turn, controlled by one of the relays which is responsive to a control signal.

When the transmitters are operating solo or in a single signal condition (as distinguished from multiplex operation), the circuit will operate much as any other switching circuit, acting as an on-off control for distributing the control signal to a number of transmitters. However, when the circuit is to be used with a number of transmitters operated in multiplex fashion, certain allowances must be made in the circuit. The switching circuit, in order to satisfactorily control the operation of a group of transmitters in synchronism with the multiplexing equipment, must insure that the control signal pulse is synchronously switched as a complete pulse to the individual transmitters of the group and in accordance with the predetermined sequence. The control signal from the multiplexing equipment is in the form of pulses of suitable amplitude and duration to control the transmitter. If the switching circuit should switch the control pulse line to any one of the multiple transmitters without being synchronized with the arrival of the control pulse from the multiplexing equipment, the first characters of a message transmitted from the multiplexing equipment will be mutilated and considerable difficulty will be experienced in communicating a clear and correct message to a distant point.

To achieve the interchangeable nature of the switching circuit, that is, one that is capable of use with either a multiplex or non-multiplex form of transmission, the relay which controls the synchronizing function and thus the sequential timing of the circuit is in one embodiment a slow operate-slow release type. Such a relay serves to properly control transmitters which may be multiplex or non-multiplex in operation, and does not deleteriously affect the operation of the circuit if a continuous or steady battery control signal for non-multiplex operation is utilized. On the other hand, the circuit automatically eliminates the random timing between the initiation of the message and the arrival of the control pulse from the multiplexing equipment when the transmitters are being operated in a relaxation control manner from an electronic or mechanical multiplex. The relay circuit insures that only complete control pulses will be passed to the clutch magnet of a message transmitter by counting the first complete control pulse or fraction thereof and utilizing this first control pulse to complete the balance of the switching functions, thereby, avoiding the mutilation of the first characters of a message as would occur if the switching circuit were not in synchronism with the transmitting multiplex equipment.

Typical telegraph transmitting stations include an auxiliary transmitter which is automatically used to transmit a message before the regular message transmitter is permitted to proceed. Such an auxiliary transmitter may transmit routing information and/or one of a sequential group of numbers, thereby, directing the message to a particular destination and/or numerically identifying the subsequent message. Such an auxiliary transmitter, as in the case of the regular message transmitter, must be controlled so that proper operation will result when either multiplex or non-multiplex operation is used. The automatic switching circuit of the invention includes the automatic control of such an auxiliary transmitter and insures its proper operation regardless of the type of operation utilized.

The automatic switching circuit of the invention further provides for the preferential operation of a rerun transmitter to complete the transmission of a repeated message. The switching circuit functions to automatically control the operation of the rerun transmitter such that a repeated message is transmitted thereby following the transmission of a message by a message transmitter and before the transmission of a subsequent message by the same or a different message transmitter. The auxiliary transmitter is not operated upon the operation of the rerun transmitter, thus, preserving a continuous, valid sequence of the information supplied by the auxiliary transmitter as when, for example, the auxiliary transmitter is used as a numbering transmitter.

A more detailed description of the invention follows with reference to the accompanying drawing in which:

Figure 1 discloses an automatic switching circuit, constructed in accordance with the invention, for controlling the operation of a pair of message telegraph transmitters, an auxiliary transmitter and a rerun transmitter;

Figure 2 is a chart given in explanation of the connections to the terminals 1 to 11 shown in Figure 1.

Referring to Figures 1 and 2, there is shown an automatic switching circuit for automatically controlling the operation of a pair of message telegraph transmitters A and B, an auxiliary transmitter N and a rerun transmitter R. These transmitters are shown in box form at the left of Figure 1 and may be any suitable clutch controlled telegraph transmitter type using sensing pins in association with a multi-element punched tape for sending out a multi-element code signal such as a five-unit signal, for example. The auxiliary transmitter N will, for purposes of description, be referred to as a numbering transmitter, but it is to be understood that the transmitter could be utilized to automatically transmit any form of information desired. The intelligence carrying output circuits of the transmitters A, B, N and R are connected to utilization circuits, not shown. The outputs of the transmitters may be connected to a common circuit keying multiplexing equipment or directly keying a radio frequency transmitter. The particular circuit to which the outputs of the transmitters are fed will depend upon the method of operation of the communication system within which the transmitters and automatic switching circuit of the invention are to be employed.

As shown in Figure 1, the invention includes a plurality of relay devices. The relays are drawn in accordance with the detached contact method of showing relays. The relay contacts are not shown associated with their own relay windings but are instead shown as part of the circuit which they control. By this method, the conditions for operation, holding and release of any relay are clearly shown. The relay contacts are all shown in their non-operated position. The contacts of each relay are identified by a capital letter designating the relay and by a number indicating the number of the contact on the relay.

When it is desired to transmit a message, one of the telegraph message transmitters A or B is selected for use. It will be assumed hereafter that transmitter A has been so selected, but it is to be understood that the operation of the circuit upon the selection of transmitter B will be the same. The message, if on tape, for example, is inserted in transmitter A closing the automatic stop contacts of transmitter A and completing an electrical circuit from ground to the positive or plus terminal of a source of potential including terminal 6, resistor R15, lead 30, the winding of relay FA, break contact 8 and armature 9 of relay FB, lead 31, break contact 8 and armature 9 of relay R and resistor R13. The term ground as used in the specification, is to be understood as referring to a point of fixed reference potential. Relay FA will then operate. Upon the operation of relay FA, break contact 8 and armature 9 of relay FA will open and open the circuit through the winding of relay FB, which is connected on one side to transmitter B through lead 32, resistor R14 and terminal 7 and on the other side to the positive terminal of a source of potential through the foregoing contacts. The energization of relay FA prevents the operation of transmitter B by the switching circuit while transmitter A is in operation. Stated otherwise, the switching circuit of the invention permits a control signal to be applied either to transmitter A or transmitter B but not to both transmitters at the same time, as will appear hereinafter. Relay FB is locked out by the operation of relay FA.

An electrical circuit is completed from the positive terminal of a source of potential to ground including lead 45, the winding of relay L, make contact 10 and armature 9 of relay FA, armature 9 and break contact 8 of relay FB, the winding of relay FA, lead 30, resistor R15 and terminal 6 of the message transmitter A. Relay L operates, and a locking circuit is provided for relay FA. The operation of relay L closes a circuit to operate relay A over a path traced from the positive terminal of a source of potential to ground including resistors R1 and R2, make contact 10 and armature 9 of relay L, resistor R4, the winding of relay A, armature 9 and break contact 8 of relay E and armature 9 and break contact 8 of relay C. Two shunt-connected resistors R1 and R2 are used in the embodiment shown in Figure 1 to permit proper power dissipation. However, resistors R1 and R2 may be replaced by a single resistor in a particular application without departing from the spirit of the invention. When relay A operates, a control signal, which may be a multiplex control pulse or a continuous potential signal, as will be more fully discussed later, supplied to terminal 1, passes through resistor R5, armature 9 and make contact 10 of relay A, resistor R6 and the winding of relay B to ground, operating relay B.

When relay B operates, a circuit is closed to operate relay C over a path traced from the positive terminals to ground including resistors R1 and R2, make contact 10 and armature 9 of relay L, lead 33, armature 2 and make contact 3 of relay B, break contact 3 and armature 4 of relay D, resistor R7, the winding of relay C, lead 37, armature 4 and break contact 3 of relay FB, armature 4 and make contact 5 of relay FA, terminal 3 and the normally closed letter contacts of the numbering transmitter N. Upon the operation of relay C, break contact 8 will no longer engage armature 9 of relay C, thereby, breaking the ground connection to the winding of relay A and interrupting the operating circuit thereof, releasing relay A. The positive terminal of a source of potential is then connected through resistor R9, armature 2 and make contact 1 of relay C, lead 38 and resistor R7 to the winding of relay C, causing relay C to self-hold. Upon the operation of relay C, a circuit is closed to operate relay D over a path traced from the positive terminal of a source of potential to ground including resistor R8, armature 7 and make contact 6 of relay C, resistor R10 and the winding of relay D.

Relay D will hold itself operated by a circuit traced from the winding of relay D through resistor R10, make contact 10 and armature 9 of relay D, lead 46, armature 2 and make contact 1 of relay L and resistors R1 and R2 to the positive terminals of a source of potential. At this point, the control signal appearing at terminal 1 having previously activated relay B, which is now deactivated due to the deactivation of relay A by the operation of relay C, will pass through armature 9 and break contact 8 of relay A, lead 34, break contact 9 and armature 8 of relay B, armature 4 and make contact 5 of relay C and armature 4 and make contact 5 of relay L to terminal 2, which is connected to the clutch magnet of the numbering transmitter N. The control signal will start a number tape or other means for transmitting one of a sequential group of numbers. After the numbering transmitter has completed the transmission of a number, the letters combination sensed following the number upon the tape, if a tape is used, opens the automatic stop contacts of the numbering transmitter connected to terminal 3, thereby, removing the ground from terminal 3 and the winding of relay C, releasing relay C.

When relay C releases, the ground connection is restored to the winding of relay A through break contact 8 and armature 9 of relay C and break contact 8 and armature 9 of relay E, operating relay A. When relay A is operated, as described above, make contact 10 engages armature 9 of relay A connecting a signal appearing at terminal 1 through resistor R5, resistor R6 and the winding of relay B to ground. Relay B will operate. The operation of relay B will not activate relay C, as was previously the case, due to the fact that the operating circuit for relay C is opened by the activation of relay D which disengages armature 4 of relay D from its break contact 3, thereby disconnecting the winding of relay C from the positive terminal. Relay C cannot operate at this time. When relay B operates, a circuit is closed to operate relay E over a path traced from the positive terminals to ground through resistors R1 and R2, armature 9 and make contact 10 of relay L, lead 33, aramture 2 and make contact 3 of relay B, lead 35, resistor R11, the winding of relay E, lead 36 and armature 9 and break contact 8 of relay C. Relay E will self-hold by a circuit traced from the positive terminal of a source of potential through resistor R12, make contact 6 and armature 7 of relay D and resistor R11. In addition, the opening of break contact 8 and armature 9 of relay E, upon the operation of relay E, releases relay A by disconnecting the ground connection to the winding of the relay. The deactivation of relay A, in turn, releases relay B via the disengagement of make contact 10 and armature 9 of relay A which disconnects terminal 1 from the winding of relay B.

At this point, the control signal on terminal 1 passes through resistor R5, armature 9 and break contact 8 of relay A, lead 34, break contact 9 and armature 8 of relay B, armature 4 and break contact 3 of relay C, armature 2 and make contact 1 of relay E, make contact 1 and armature 2 of relay D and armature 7 and make contact 6 of relay FA to terminal 4 which is connected to the clutch magnet of message transmitter A, thereby operating transmitter A. When a message has passed completely through the message transmitter A, the automatic stop contacts of A transmitter, which are connected to terminal 6, will be opened removing ground from the winding of relay FA, releasing relay FA. When relay FA releases, relays L, D and E which are activated will also be released. The disengagement of make contact 1 and armature 2 of relay L disconnects the positive terminal from the winding of relay D. Make contact 6 and armature 7 of relay D will open disconnecting the positive terminal from the winding of relay E. The entire switching sequence is deactivated, and is ready for immediate use upon the grounding of either terminal 6 or 7 which are connected to transmitters A and B, respectively, one of which may now be selected or have already been selected for further operation.

An important aspect of the invention is the fact that the automatic switching circuit will operate to control the selection of a transmitter in response to either a continuous potential control signal or multiplex control pulse. The foregoing description outlines the operation of the circuit when a continuous or steady battery control signal is being received at terminal 1. Such a signal could be supplied from a standard battery or any type of generator capable of delivering a steady continuous potential signal. The circuit will operate to automatically connect terminal 1 to the numbering transmitter and, thereafter, to one of the message transmitters A or B that has been selected for operation. In order to permit the operation of the circuit in connection with multiplex equipment, it is necessary to supply control pulses at terminal 1 which will operate the switching circuit and thus the message and numbering transmitters in synchronism with the multiplex transmitting equipment. The control pulses may be supplied from the multiplex equipment or from a pulse generator, the operation of which is controlled by the multiplex equipment. When an operator connects terminals 6 or 7 to ground by selecting the transmitter he wishes to operate, he has no way of knowing when a synchronizing pulse will appear at terminal 1. If the circuit were allowed to operate merely as a distributing device for the control pulse, the switching functions would be completed at random with respect to the arrival of the first control pulse, thereby connecting the control pulse line, terminal 1, to the transmitter clutch magnet at random. This is objectionable in that an incomplete control pulse could be passed to the clutch of the number transmitter via terminal 2 or message transmitters via terminals 4 and 5. The transmitters would be placed in operation out of synchronism with the control pulse utilized in the multiplex operation. The first few characters of the multiplex message transmitted would therefore be mutilated causing considerable delay and difficulty in completing the transmission of a message to a distance location.

To avoid this difficulty, relay B is in one embodiment a slow operate-slow release type whose total operating cycle in conjunction with relays C and D is sufficient to insure the counting of the first complete control pulse or sufficient part thereof and to have completed the switching functions of the relays so that the next complete control pulse can pass to the clutch of the number transmitter N via terminal 2 or message transmitters A and B via terminals 4 or 5. If at the time the contacts of relay A complete a circuit to the winding of relay B from terminal 1 a pulse of insufficient remaining duration was being received at terminal 1, relay B, because of its slow operate characteristics, would not become activated. Immediately, however, upon the reception of the next complete control pulse or a sufficient part thereof, relay B will operate. Contact 3 and armature 2 of relay B activating relays C and D, as above described, then allow the next complete pulse to be supplied to the transmitter selected for operation. The use of a slow operate-slow release type of relay for relay B will not effect the operation of the circuit if the circuit should be used in response to a continuous or steady battery control signal appearing at terminal 1 in non-multiplex operation. Relay B would merely operate at the time delay brought about by the slow operating nature thereof. The delayed time of response in no way effects the over-all operation and response of the switching circuit when used with non-multiplex operated telegraph transmitters. However, as pointed out above, when the circuit is used to control the operation of multiplex operated telegraph transmitters, the slow operating and release action of relay B will insure that the switching circuit operating in response to control pulses appearing at terminal 1 will be in synchronism with the multiplex transmitting equipment. Only a control pulse sufficient in size to insure the adequate and synchronous operation of the transmitters will be passed from terminal 1 through the switching circuit to the clutch of the particular transmitter under control.

During the normal operation of a transmitting station, it is oft times necessary to transmit messages other than the regular type of message communication. For example, it may be necessary to transmit testing signals for the purpose of checking equipment. During such transmission it is not necessary and, in fact, objectionable to have the numbering transmitter precede the message with a number. The automatic switching circuit of the invention provides means for disconnecting the numbering transmitter from the circuit so as to avoid such operation of the numbering transmitter.

When the operator desires to forward a message not preceded by a number, he operates a control device connected to terminals 8 and 9 which, for example, may be a normally open push-button switch 22. Upon the closing of the switch 22, momentarily, a circuit is closed to complete a path from the positive terminal through resistor R8, terminals 8 and 9 and resistor R10 to the winding of relay D, the other side of which is connected to ground. Relay D will operate, disengaging break contact 3 and armature 4 of relay D. Upon the opening of contact 3 and armature 4 of relay D, relay C cannot be operated and in fact will remain in an inoperative condition regardless of the operation of the remaining relays in the circuit. The opening of the contacts of relay D will disconnect the winding of relay C from the positive terminal of a source of potential. While the push button 22 or other control device connected to terminals 8 and 9 is momentarily closed, one of the transmitters A or B is selected for operation and relay FA or FB is operated by the completion of a ground connection through terminal 6 or 7. Relays A and B will be operated in the manner described above. Relay C will remain inoperative, relays D and E remaining activated in response to the operation of relays A and B. A control signal which may be a continuous or pulse type signal is connected from terminal 1 to either transmitter A or transmitter B through terminals 4 or 5, respectively, thus having avoided the use of the auxiliary transmitter N. Upon the completion of the message, relay FA or FB will be deactivated, depending upon the particular transmitter selected for use, returning the switching circuit to its standby condition.

The automatic switching circuit of the invention will normally function in the manner outlined above to control the operation of the message transmitters A, B and the auxiliary transmitter N in either multiplex or non-multiplex fashion. A situation may arise, however, such that it is necessary to repeat a message already transmitted by one of the message transmitters A, B. The message may have been received in a garbled condition or not at all by a receiving station. The transmission of the repeated message requires that the normal sequence of operation of the message transmitters A, B be interrupted to permit the operation of the rerun transmitter R. The circuit operations which occur in this situation will now be described.

It will be assumed that message transmitter A is in the process of sending a message. However, the circuit operations to be described will be the same if message transmitter B should be in operation instead of message transmitter A. When message transmitter A is in operation, relays FA, D, E and L are all in an operated condition. When it becomes necessary to repeat the transmission of a message, an operator places a tape produced by suitable monitoring means and including the message to be repeated in the sensing contacts of the rerun transmitter R. The operator thereafter presses a manual start button. An electrical connection is completed from ground to the positive terminal of a source of potential including terminal 10, the winding of relay R, lead 47 and resistor R3. Relay R is operated. At the completion of the message transmitted by message transmitter A, relays FA, D, E and L all become inoperative. Normally, message transmitter A or B would then be operated to transmit a subsequent message, depending upon which of the message transmitters A or B had a message ready for transmission as indicated by the operation of relay FA or relay FB, respectively. The operation of relay R, however, prevents the operation of either relay FA or FB by opening the break contact 8 and armature 9 of relay R in the operating circuit of the relays FA, FB. As a result, neither one of the message transmitters A or B can be placed in operation at this time.

An electrical connection is completed from the positive terminals to ground including resistors R1 and R2, make contact 5 and armature 4 of relay R, break contact 8 and armature 9 of relay L, resistor R4, the winding of relay A, armature 9 and break contact 8 of relay E and armature 9 and break contact 8 of relay C. Relay A operates, connecting the terminal 1 to the winding of relay B over the electrical path including resistor R5, armature 9 and make contact 10 of relay A and resistor R6. A continuous potential control signal or multiplex control pulse is applied to the winding of relay B. Relay B functions in the manner previously described. When relay B operates, an electrical path is completed from the positive terminals to ground including resistors R1 and R2, make contact 5 and armature 4 of relay R, break contact 8 and armature 9 of relay L, lead 33, armature 2 and make contact 3 of relay B, break contact 3 and armature 4 of relay D, resistor R7, the winding of relay C, armature 4 and break contact 3 of relay FB, armature 4 and break contact 3 of relay FA and make contact 1 and armature 2 of relay R. Relay C operates. Break contact 8 and armature 9 of relay C open, and relay A becomes inoperative. A holding circuit is provided for relay C over the electrical circuit including make contact 1 and armature 2 of relay C and resistor R9.

When relay B releases, an electrical circuit is completed from terminal 1 to the clutch magnet of the rerun transmitter R including resistor R5, armature 9 and break contact 8 of relay A, lead 34, break contact 9 and armature 8 of relay B, armature 4 and make contact 5 of relay C, armature 4 and break contact 3 of relay L and terminal 11. The rerun transmitter proceeds to transmit the repeated message in response to the continuous potential control signal or multiplex control pulse supplied via terminal 1. It should be noted that the auxiliary or numbering transmitter N was not operated in this sequence, preserving the valid numbering sequence provided by the numbering transmitter N. The repeated message will have been numbered for reference purposes upon the previous or original transmission thereof by one of the message transmitters A or B.

Following the completion of the transmission of the repeated message, the automatic stop contacts of the rerun transmitter R open removing the ground connection from terminal 10 and the winding of relay R. Relay R becomes inoperative, armature 2 and make contact 1 of relay R open, and relay C becomes inoperative. The switching circuit is now completely restored to normal. If a message is awaiting transmission by either of the message transmitters A or B, relay FA or FB will operate immediately following the release of relay R. The resulting circuit operations will be the same as have already been described. As indicated by the above description, it is not required that the rerun operator and the regular message operator know the status of each others transmitters. The switching circuit of the invention is arranged to automatically operate the rerun transmitter to transmit a repeated message at the conclusion of a message transmitted by one of the message transmitters A or B and before the transmission of a subsequent message by the same or a different one of the message transmitters.

In order to eliminate arcing across the contacts of the relays, a surge suppressor may be connected directly across the winding of each relay, which may, for example, take the form of a pair of oppositely poled crystal diodes, not shown.

In a circuit constructed in accordance with the invention, relay B was a 25 millisecond operating-55 millisecond releasing relay at 60 ma. winding current. It was found that such values for the slow operate-slow release relay secured the desired operation. It should be noted however, that relay B does not necessarily have to be a slow operate-slow release type relay, if the relay type chosen for relays A, B, C and E are such that their normal operate times and release times meet both of the following conditions: namely (1) The operate time of relay B plus the operate time of relay C plus the release time of relay A plus the release time of relay B when added together shall be equal to or greater than the total possible length of the multiplex control pulse, and (2) the operate time of relay B plus the operate time of relay E plus the release time of relay A plus the release time of relay B when added together shall be equal to or greater than the total possible length of the multiplex control pulse.

Then, the automatic switching circuit described herein will operate as required in synchronism with the multiplex equipment without the necessity of relay B having slow operate-slow release characteristics. The construction of the automatic switching circuit herein described to meet the two conditions stated above, without the use of a slow operate-slow release type for relay B, would in no way effect the operation of the circuit as described herein.

Typical values of the resistors utilized in the circuit given by way of example with a positive potential of 120 volts are as follows:

| | Ohms |
|---|---|
| Resistor 1 | 1000 |
| Resistor 2 | 1000 |
| Resistor 3 | 500 |
| Resistor 4 | 1200 |
| Resistor 5 | 300 |
| Resistor 6 | 1250 |
| Resistor 7 | 1200 |
| Resistor 8 | 500 |
| Resistor 9 | 500 |
| Resistor 10 | 1200 |
| Resistor 11 | 1200 |
| Resistor 12 | 500 |
| Resistor 13 | 800 |
| Resistor 14 | 1250 |
| Resistor 15 | 1250 |

What is claimed is:

1. In combination, a transmitter requiring a control signal to transmit, a relay device set to operate and to release following given time delays, a source of control signals, a first switching means connected to said transmitter and said device and responsive to a condition in said transmitter to connect said device to said source, said device being operated upon the reception thereby of a control signal from said source having a given duration corresponding to the operate time delay of said device following the connection of said device to said source by said switching means, a second switching means connected to said transmitter and said device and responsive to the operation of said device to connect said transmitter to said source to apply a control signal from said source to said transmitter to enable said transmitter to transmit, a second transmitter requiring a control signal to transmit, a third switching means connected to said second transmitter and said first switching means and responsive to a second condition in said second transmitter to cause said first switching means to remain inoperative in response to said first condition and to connect said device to said source, said device being operated upon the reception thereby of a control signal of said given duration from said source following the connection of said device to said source, said second switching means being responsive to the operation of said device by said first and third switching means to connect only said second transmitter to said source to apply a control signal from said source to said second transmitter to enable said second transmitter to transmit.

2. An automatic switching circuit comprising a transmitter requiring a control signal to transmit, a first relay device set to operate and to release following given time delays, a source of control signals, a first switching means including a plurality of relay devices connected to said transmitter and said first device and responsive to a first condition in said transmitter to connect said first device to said source, said first device being operated upon the reception thereby of a control signal from said source having a given duration corresponding to the operate time delay of said first device following the connection of said first device to said source, a second switching means including a plurality of relay devices connected to said transmitter and said first device and responsive to the operation of said first device to connect said transmitter to said source to apply a control signal from said source to said transmitter to enable said transmitter to transmit, a second transmitter requiring a control signal to transmit, a second relay device connected to said second transmitter and to said first switching means and responsive to a second condition in said second transmitter to cause said first switching means to remain inoperative in response to said first condition and to connect said first device to said source, said first device being operated upon the reception thereby of a control signal from said source of said given duration following the connection of said first device to said source, said second switching means being responsive to the operation of said first device by said first switching means and said second device to connect only said second transmitter to said source to apply a control signal from said source to said second transmitter to enable said second transmitter to transmit.

3. An automatic switching circuit comprising first and second message transmitters each requiring a control signal to transmit and having a first condition when ready to transmit, a first relay device set to operate and to release following given time delays, a source of control signals, a first switching means including a plurality of relay devices connected to both of said transmitters and said first device and responsive to said first condition in said first transmitter to connect said first device to said source, said first device being operated upon the reception thereby of a control signal from said source having a given duration corresponding to the operate time delay of said first device following the connection of said first device to said source, a second switching means including a plurality of relay devices connected to said transmitters and said first device and responsive to the operation of said first device by said first switching means to connect said first transmitter to said source so as to apply a control signal from said source to said first transmitter to enable said first transmitter to transmit, a rerun transmitter requiring a control signal to transmit and having a second condition when ready to transmit, a second relay device connected to said rerun transmitter and to said first switching means and responsive to said second condition to cause said first switching means to remain inoperative in response to said first condition and to connect said first device to said source, said first device being operated upon the reception thereby of a control signal from said source of said given duration following the connection of said first device to said source, said second switching means being responsive to the operation of said first device by said first switching means and said second device to connect only said rerun transmitter to said source to apply a control signal from said source to said rerun transmitter to enable said rerun transmitter to transmit.

4. In combination, a transmitter requiring a control pulse to transmit, a first relay device set to operate and to release following given time delays, a source of signal energy in the form of a train of control pulses of given duration, a first switching means connected to said first device and including at least a second relay device coupled to said transmitter responsive to a first condition in said transmitter to connect said first device to said source, said first device being set to operate in response to the first control pulse applied thereto from said source having a duration corresponding to the operate time delay of said first device following the connection of said first device to said source, a second switching means connected to said transmitter and to said first device and responsive to the operation of said first device to connect said transmitter to said source to apply a control pulse of said given duration from said source to said transmitter to enable said transmitter to transmit, a second transmitter requiring a control pulse to transmit, a third switching means connected to said second transmitter and said first switching means and responsive to a second condition in said second transmitter to cause said first switching means to remain inoperative in response to said first condition and to connect said first device to said source, said first device being operated upon the reception thereby of a control pulse from said source having a duration corresponding to said operate time delay following the connection of said first device to said source, said second switching means being responsive to the operation of said first device by said first and third switching means to connect only said second transmitter to said source to apply a control pulse of said given duration from said source to said second transmitter to enable said second transmitter to transmit.

5. An automatic switching circuit comprising first and second message transmitters each requiring a control pulse to transmit and having a first condition when ready to transmit, a source of signal energy in the form of a train of control pulses of given duration, a first relay device set to operate following a time delay less than the duration of said control pulses and to release following a time delay not exceeding the interval between said control pulses, a first switching means connected to said first device and including at least a second relay device coupled to said transmitters responsive to said first condition in said first transmitter to connect said first device to said source, said first device being set to operate upon the reception of a control pulse from said source having a duration corresponding to the operate time delay of said first device following the connection of said first device to said source, a second switching means connected to said transmitters and said first device and responsive to the operation of said first device by said first switching means to connect said first transmitter to said source so as to apply a control pulse of said given duration from said source to said first transmitter to enable said first transmitter to transmit, a rerun transmitter requiring a control pulse to transmit and having a second condition when ready to transmit, a third relay device connected to said rerun transmitter and to said first switching means and responsive to said second condition to cause said first switching means to remain inoperative in response to said first condition and to connect said first device to said source, said first device being operated upon the reception thereby of a control pulse from said source having a duration corresponding to said operate time delay following the connection of said first device to said source, said second switching means being responsive to the operation of said first device by said first switching means and said third device to connect only said rerun transmitter to said source to apply a control pulse of said given duration from said source to said rerun transmitter to enable said rerun transmitter to transmit.

6. A combination as claimed in claim 4 and wherein said first relay device is set to operate following a time delay less than the duration of said control pulses and to release following a time delay less than the interval between said control pulses.

7. An automatic switching circuit as claimed in claim 5 and wherein said first and second switching means each comprises a plurality of electromagnetic relays.

References Cited in the file of this patent

UNITED STATES PATENTS

| | | |
|---|---|---|
| 2,667,533 | Zenner | Jan. 26, 1954 |
| 2,805,283 | Stiles | Sept. 3, 1957 |